United States Patent
Lin et al.

(10) Patent No.: US 9,613,556 B2
(45) Date of Patent: Apr. 4, 2017

(54) ELECTRONIC DEVICE RESISTANT TO RADIO-FREQUENCY DISPLAY INTERFERENCE

(71) Applicant: Apple Inc., Cupertino, CA (US)

(72) Inventors: Hung Sheng Lin, San Jose, CA (US); Sang Y. Youn, Cupertino, CA (US); Hopil Bae, Sunnyvale, CA (US); Mohammad Ali Jangda, San Jose, CA (US); Ahmad Al-Dahle, San Jose, CA (US); Wei H. Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 14/474,786

(22) Filed: Sep. 2, 2014

(65) Prior Publication Data

US 2016/0063907 A1   Mar. 3, 2016

(51) Int. Cl.
| | |
|---|---|
| G09G 5/00 | (2006.01) |
| G09G 3/20 | (2006.01) |
| H04B 15/00 | (2006.01) |
| H04W 4/00 | (2009.01) |
| G09G 3/3225 | (2016.01) |
| G09G 3/3266 | (2016.01) |
| G09G 3/36 | (2006.01) |

(52) U.S. Cl.
CPC .............. *G09G 3/20* (2013.01); *G09G 3/3225* (2013.01); *G09G 3/3266* (2013.01); *G09G 3/3648* (2013.01); *G09G 3/3674* (2013.01); *H04B 15/00* (2013.01); *H04W 4/008* (2013.01); *G09G 2310/0267* (2013.01); *G09G 2330/06* (2013.01)

(58) Field of Classification Search
CPC ............. G09G 3/20; G09G 2310/0264; G09G 2310/0257; H04B 15/00; H04W 4/008; H04W 24/08
See application file for complete search history.

(56) References Cited

U.S. PATENT DOCUMENTS

| | | | |
|---|---|---|---|
| 6,985,174 B1 | 1/2006 | Thompson et al. | |
| 7,676,197 B2* | 3/2010 | Lin ........................ | H04B 15/02 375/132 |
| 8,253,675 B2* | 8/2012 | Kim ........................ | G06F 3/147 345/94 |
| 8,385,485 B2 | 2/2013 | Skinner et al. | |
| 8,400,408 B2 | 3/2013 | Hotelling et al. | |
| 8,412,105 B2* | 4/2013 | Dorsey .................. | H04B 15/02 375/346 |
| 8,417,983 B2* | 4/2013 | Machnicki ................ | G06F 1/08 326/93 |

(Continued)

*Primary Examiner* — Peter D McLoone
(74) *Attorney, Agent, or Firm* — Treyz Law Group, P.C.; G. Victor Treyz; Zachary D. Hadd

(57) ABSTRACT

An electronic device may be provided with wireless circuitry and a display. A display driver integrated circuit in the display may have a spectrum analyzer circuit. An antenna may monitor for wireless signals. The display driver integrated circuit may use the spectrum analyzer circuit to analyze the wireless signals and determine whether there is a potential for visible display artifacts. In the presence of conditions that can lead to display artifacts, the display driver integrated circuit may adjust a gate driver control signal. Adjustments to the gate driver control signal may be made using adjustable signal dividers. The adjustments to the gate driver control signal eliminate the visible display artifacts.

17 Claims, 8 Drawing Sheets

(56) References Cited

U.S. PATENT DOCUMENTS

| | | | |
|---|---|---|---|
| 9,184,856 B2* | 11/2015 | Usui | H04B 15/02 |
| 2003/0198307 A1* | 10/2003 | Neill | H04B 15/02 |
| | | | 375/346 |
| 2005/0206595 A1* | 9/2005 | Park | G09G 3/20 |
| | | | 345/87 |
| 2006/0166622 A1* | 7/2006 | Usui | H04B 15/02 |
| | | | 455/63.1 |
| 2007/0004339 A1* | 1/2007 | Lin | H04B 15/02 |
| | | | 455/63.3 |
| 2008/0079676 A1* | 4/2008 | Pak | G09G 3/3677 |
| | | | 345/87 |
| 2008/0165180 A1* | 7/2008 | Lee | G09G 3/3648 |
| | | | 345/214 |
| 2009/0066677 A1* | 3/2009 | Kim | G06F 3/147 |
| | | | 345/204 |
| 2009/0138745 A1* | 5/2009 | Dorsey | H04B 15/04 |
| | | | 713/501 |
| 2012/0144224 A1* | 6/2012 | Machnicki | H04B 15/06 |
| | | | 713/500 |
| 2012/0178503 A1 | 7/2012 | Merz et al. | |
| 2012/0184228 A1 | 7/2012 | Mujtaba et al. | |
| 2015/0207493 A1* | 7/2015 | Han | H03L 3/00 |
| | | | 345/213 |

* cited by examiner

ELECTRONIC DEVICE RESISTANT TO RADIO-FREQUENCY DISPLAY INTERFERENCE

BACKGROUND

This relates generally to electronic devices and, more particularly, to electronic devices with displays.

Electronic devices often include displays for displaying information to users. Wireless circuitry is also commonly incorporated into many electronic devices. During wireless communications, there is a potential for wireless signals to be coupled into display circuitry in a device. Wireless interference of this type can lead to visible display artifacts. For example, interference due to the presence of wireless signals may result in flickering frames and spatial lines effects on a display. Display artifacts disrupt normal display operation and can impede the ability of a user to view information on a display.

It would therefore be desirable to be able to provide an electronic device with an enhanced ability to reduce display interference.

SUMMARY

An electronic device may be provided with wireless circuitry and a display. The wireless circuitry may include radio-frequency transceiver circuitry for communicating with external equipment. During wireless communications, signals such as signals from the external equipment may be coupled into the device and serve as a source of wireless interference.

In the presence of wireless interference, the display in the electronic device has the potential to exhibit visible artifacts. To prevent the appearance of visible artifacts, control circuitry in the display may make adjustments to the gate driver circuitry in the display. For example, adjustments may be made to the frame rate and line frequency of the display.

A display driver integrated circuit in the display may have circuitry that implements a spectrum analyzer circuit. An antenna may monitor for wireless signals. The display driver integrated circuit may use the spectrum analyzer to analyze the wireless signals and determine whether there is a potential for visible display artifacts. In the presence of conditions that can lead to display artifacts, the display driver integrated circuit may adjust a gate driver control signal by adjusting the frame rate and line frequency. Adjustments to the gate driver control signal may be made using adjustable signal dividers. The adjustments to the gate driver control signal eliminate the visible display artifacts.

DETAILED DESCRIPTION

An electronic device may be provided with components such as a display for displaying images for a user and wireless circuitry to support wireless communications. To prevent wireless signals or other signals from interfering with operation of the display, display driver circuitry in the display may be provided with interference mitigation circuitry. The interference mitigation circuitry may be used to detect whether interference is present and to take appropriate action in the presence of detected interference signals.

Figure 1:
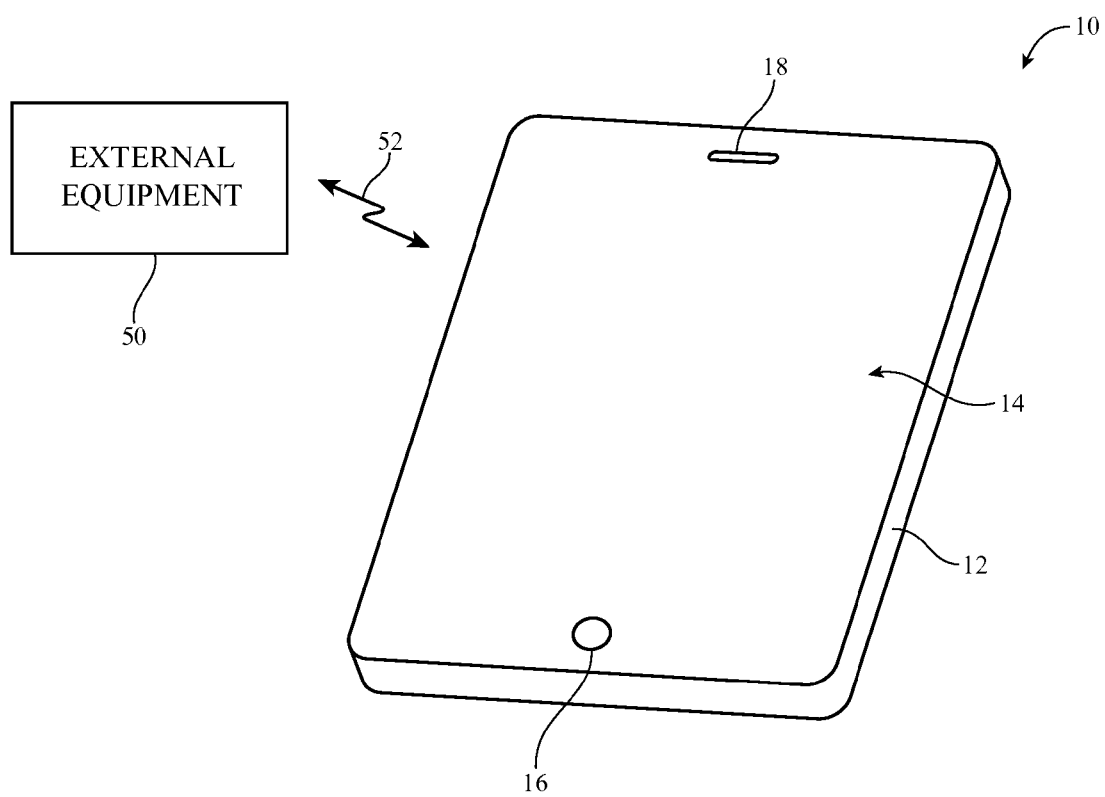
FIG. 1 is a perspective view of an illustrative electronic device that is communicating wirelessly with external equipment in accordance with an embodiment.

FIG. 1 is a perspective view of an illustrative electronic device of the type that may be include a display with interference mitigation circuitry. An electronic device such as electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wristwatch device, pendant device, or other portable computing device. Other configurations may be used for device 10 if desired. The example of FIG. 1 is merely illustrative.

Device 10 may have one or more displays such as display 14 mounted in housing structures such as housing 12. Openings may be formed in housing 12 and/or display 14 to accommodate features such as button 16 and speaker port 18 (as examples). Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may be a liquid crystal display, an organic light-emitting diode display, an electrophoretic display, a plasma display, an electrowetting display, a display formed using other display technologies, or a display that uses two or more of these display technologies in a hybrid configuration.

Electronic device 10 may include wireless circuitry for supporting wireless communications. As shown in FIG. 1, the wireless circuitry of electronic device 10 may be used to allow device 10 to communicate wirelessly with external wireless equipment 50 over wireless link 52. Wireless communications link 52 may be a cellular telephone link, a near-field communications link, a local area network link, a link that supports peer-to-peer communications or other suitable wireless link. External equipment 50 may be a cellular telephone base station, may be equipment in a wireless local area network such as a wireless access point or wireless router, may be a peer device, may be a near-field communications reader (e.g., a reader associated with a point of sale terminal or other equipment), or may be other wireless equipment.

Figure 2:
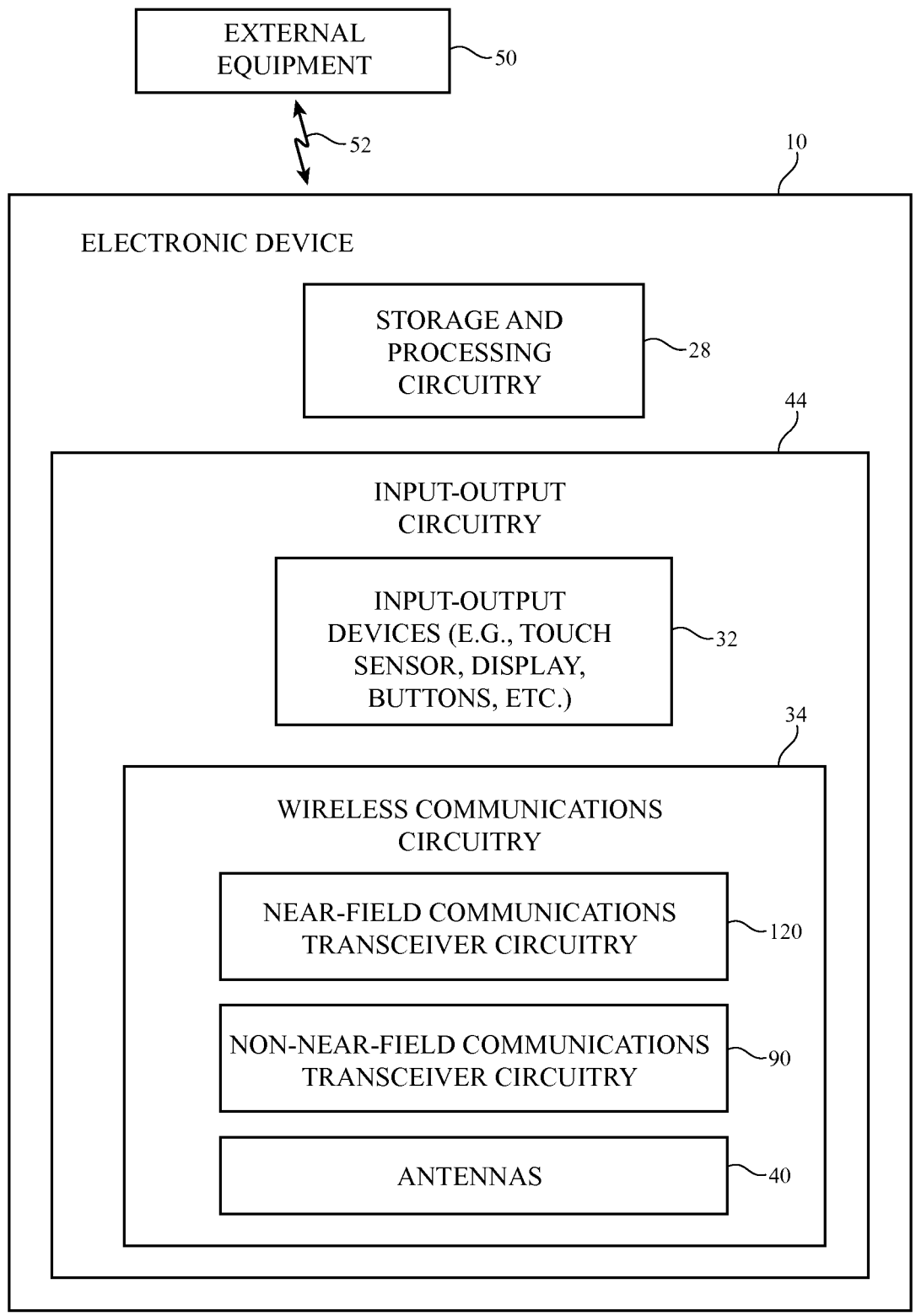
FIG. 2 is a schematic diagram of an illustrative electronic device with wireless communications circuitry and external equipment with wireless communications circuitry that are communicating over a wireless link in accordance with an embodiment.

A schematic diagram showing illustrative components that may be used in device 10 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens (e.g., a capacitive touch sensor array that overlaps a display such as display 14), displays such as display 14 without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 44 may include wireless communications circuitry 34 for communicating wirelessly with external equipment 50 over wireless links such as link 52. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, transceiver circuitry 90 may handle non-near-field communications bands such 2.4 GHz and 5 GHz bands for WiFi® (IEEE 802.11) communications and the 2.4 GHz Bluetooth® communications band, mesh network bands such as bands at 2.4 GHz, 900 MHz, and 868 MHz, cellular telephone bands or other communications bands between 700 MHz and 2700 MHz, signals at 60 GHz, satellite navigation system signals, etc.

Wireless communications circuitry 34 may also have near-field communications transceiver circuitry 120. Near-field communications circuitry 120 may produce and receive near-field communications signals to support communications between device 10 and a near-field communications reader or other external near-field communications equipment. Near-field communications may be supported using loop antennas to support inductive near-field communications in which a loop antenna in device 10 is electromagnetically near-field coupled to a corresponding loop antenna in a near-field communications reader. Near-field communications links may be formed over distances of 20 cm or less (i.e., these links may involve placing device 10 in the vicinity of the near-field communications reader for effective communications). Near-field communications circuitry 120 may operate at 13.56 MHz or other suitable frequency.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and/or other far-field wireless communications, the structures of antennas 40 may be used in supporting near-field communications.

Figure 3A:
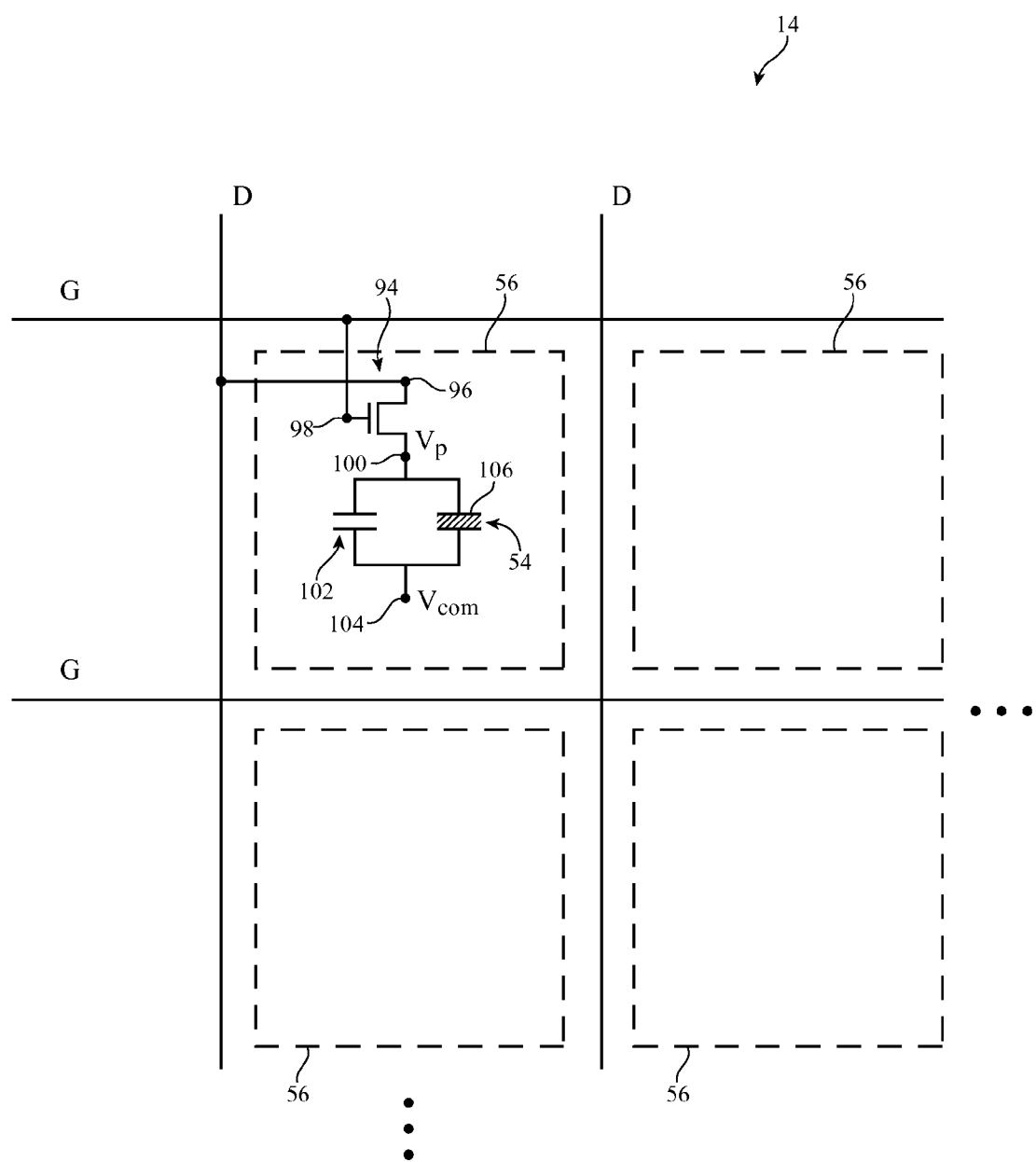
FIG. 3A is a diagram of a portion of an illustrative liquid crystal display in accordance with an embodiment.

Display 14 contains an array of pixels for displaying images for a user of device 10. A portion of an illustrative display such as a liquid crystal display is shown in FIG. 3A. As shown in FIG. 3A, display 14 may be controlled using control signals produced by display driver circuitry. Display driver circuitry may be implemented using one or more integrated circuits (ICs) and may sometimes be referred to as a driver IC, display driver integrated circuit, or display driver.

During operation of device 10, control circuitry in device 10 such as memory circuits, microprocessors, and other storage and processing circuitry may provide data to the display driver circuitry. The display driver circuitry may convert the data into signals for controlling pixels 56.

Pixels 56 may be arranged in an array having rows and columns, as shown in FIG. 3A. The circuitry of the pixel array (i.e., the rows and columns of pixel circuits for pixels 56) may be controlled using signals such as data line signals on data lines D and gate line signals on gate lines G.

Pixels 56 may contain thin-film transistor circuitry. For example, pixels 56 may contain silicon thin-film transistor circuitry such as polysilicon transistor circuitry or amorphous silicon transistor circuitry, semiconducting oxide thin-film transistor circuitry such as indium gallium zinc oxide transistor circuitry, or other silicon or semiconducting-oxide transistor circuitry. Pixels 56 may also include associated electrode structures for producing electric fields across a liquid crystal layer in display 14. Each of pixels 56 may have one or more thin-film transistors. For example, each pixel 56 may have a respective thin-film transistor such as thin-film transistor 94 to control the application of electric fields to a respective pixel-sized portion 54 of a liquid crystal layer in display 14. Display 14 may contain a color filter layer having an array of color filter elements associated with respective pixels 56 and a thin-film transistor layer on which circuitry such as the circuitry of FIG. 3A is formed. A liquid crystal layer may be interposed between the color filter layer and the thin-film transistor layer. Other configurations for display 14 may be used, if desired. The use of a liquid crystal display technology for forming display 14 is merely illustrative.

The thin-film transistor structures that are used in forming pixels 56 may be located on a thin-film transistor substrate such as a layer of glass. The thin-film transistor substrate and the structures of pixels 56 that are formed on the surface of the thin-film transistor substrate may collectively form a thin-film transistor layer in display 14.

Gate driver circuitry may be used to generate gate signals on gate lines G. The gate driver circuitry may be formed from thin-film transistors on the thin-film transistor layer or may be implemented in separate integrated circuits. The data line signals on data lines D in display 14 carry analog image data (e.g., voltages with magnitudes representing pixel brightness levels). During the process of displaying images on display 14, a display driver integrated circuit may receive digital data from control circuitry in device 10 and may produce corresponding analog data signals. The analog data signals may be demultiplexed and provided to data lines D.

The data line signals on data lines D are distributed to the columns of pixels 56. Gate line signals on gate lines G are provided to the rows of pixels 56 by associated gate driver circuitry.

The circuitry of display 14 such as demultiplexer circuitry, gate driver circuitry, and the circuitry of pixels 56 may be formed from conductive structures (e.g., metal lines and/or structures formed from transparent conductive materials such as indium tin oxide) and may include transistors such as transistor 94 that are fabricated on the thin-film transistor substrate layer of display 14. The thin-film transistors may be, for example, silicon thin-film transistors or semiconducting-oxide thin-film transistors.

One of pixels 56 may be located at the intersection of each gate line G and data line D in display 14. A data signal on each data line D may be supplied to terminal 96 from one of data lines D. Thin-film transistor 94 (e.g., a thin-film polysilicon transistor or an amorphous silicon transistor) may have a gate terminal such as gate 98 that receives gate line control signals on gate line signal path G. When a gate line control signal is asserted, transistor 94 will be turned on and the data signal at terminal 96 will be passed to node 100 as voltage Vp. Data for display 14 may be displayed in frames. Following assertion of the gate line signal in each row to pass data signals to the pixels of that row, the gate line signal may be deasserted. In a subsequent display frame, the gate line signal for each row may again be asserted to turn on transistor 94 and capture new values of Vp.

Each pixel 56 may have a signal storage element such as capacitor 102 or other charge storage elements. Storage capacitor 102 may be used to store signal Vp in each pixel 56 between frames (i.e., in the period of time between the assertion of successive gate signals).

Display 14 may have a common electrode coupled to node 104. The common electrode (which is sometimes referred to as the Vcom electrode) may be used to distribute a common electrode voltage such as common electrode voltage Vcom to nodes such as node 104 in pixels 56. The Vcom electrode 104 may be implemented using a blanket film of a transparent conductive material such as indium tin oxide and/or a layer of metal that is sufficiently thin to be transparent.

In each pixel 56, capacitor 102 may be coupled between nodes 100 and 104. A parallel capacitance (sometimes referred to as capacitance $C_{LC}$) arises across nodes 100 and 104 due to electrode structures in pixel 56 that are used in controlling the electric field through the liquid crystal material 54 of the pixel. As shown in FIG. 3A, electrode structures 106 (e.g., a display pixel electrode with multiple fingers or other display pixel electrode for applying electric fields to liquid crystal material 54) may be coupled to node 100 (or a multi-finger display pixel electrode may be formed at node 104). The capacitance $C_{LC}$ across liquid crystal material 54 is associated with the capacitance between electrode structures 106 and common electrode Vcom at node 104. During operation, electrode structures 106 may be used to apply a controlled electric field (i.e., a field having a magnitude proportional to Vp-Vcom) across pixel-sized liquid crystal material 54 in pixel 56. Due to the presence of storage capacitor 102 and the capacitance $C_{LC}$ of material 54, the value of Vp (and therefore the associated electric field across liquid crystal material 54) may be maintained across nodes 106 and 104 for the duration of the frame.

The electric field that is produced across liquid crystal material 54 causes a change in the orientations of the liquid crystals in liquid crystal material 54. This changes the polarization of light passing through liquid crystal material 54. The change in polarization may, in conjunction with upper and lower polarizers in display 14, be used in controlling the amount of light that is transmitted through each pixel 56 in display 14 (e.g., how much light from a backlight unit is transmitted through each pixel 56).

Figure 3B:
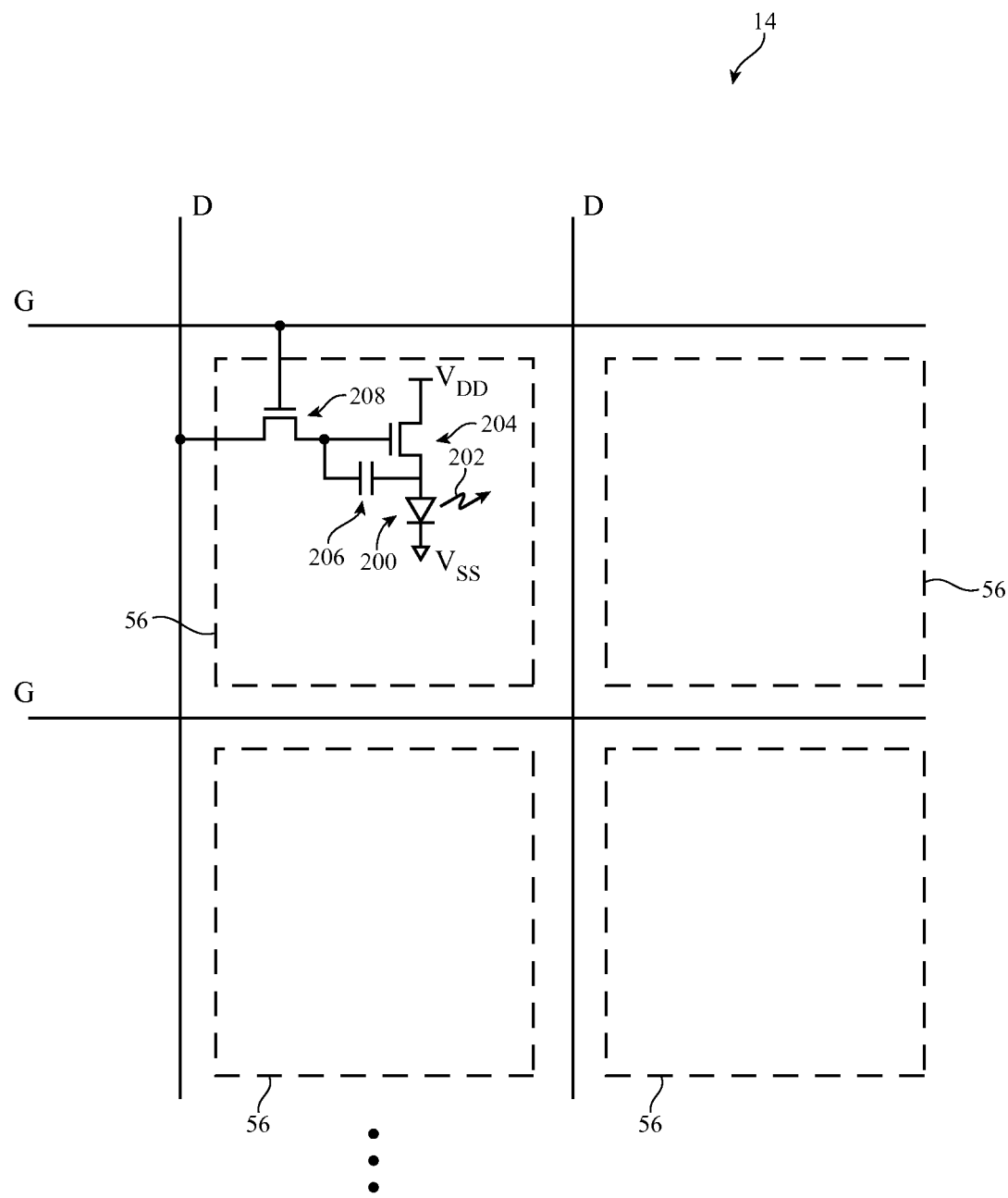
FIG. 3B is a diagram of a portion of an illustrative organic light-emitting diode array in accordance with an embodiment.

A portion of an illustrative display such as an organic light-emitting diode display is shown in FIG. 3B. As shown in FIG. 3B, each pixel 56 of display 14 may have an organic light-emitting diode such as diode 200 that emits light 202 under control of a drive current produced by drive transistor 204. Drive transistor 204 may be coupled in series with organic light-emitting diode 200 between positive power supply Vdd and ground power supply Vss. Image data from data line D may be loaded onto the gate of drive transistor 204 using switching transistor 208. Transistor 208 may be controlled by control signals on gate line G. The magnitude of the voltage on the gate of drive transistor 204 controls the amount of drive current supplied to diode 200 and thereby adjusts the amount of light 202 that is produced by diode 200. Capacitor 206 may be used to store the voltage on the gate of drive transistor 204 between successive frames of image data. If desired, organic light-emitting diode display pixel 56 may have additional components (e.g., additional switching transistors to implement a two-switch pixel, one or two emission enable transistors coupled in series with the drive transistor to help implement functions such as threshold voltage compensation, etc.). The configuration of pixel 56 in FIG. 3B is merely illustrative.

The display driver circuitry for display 14 may operate at a frame rate of about 60 Hz or other suitable rate. At a frame rate $f_{frame}$ of 60 Hz, new frame of image data will be displayed on pixels 56 in display 14 each 1/60 s. The time period between asserting the gate signals in successive rows of pixels 56 is sometimes referred to as the row-to-row time or the line time of a display and the frequency of the gate signal transitions from line to line (row to row) may be referred to as the line frequency or line-to-line frequency. In a display that has a 60 Hz frame rate and 1000 rows (lines) of pixels 56, the line frequency $f_{line}$ will be 60 kHz (ignoring the time period consumed by the blanking interval in each frame).

Radio-frequency signals can give rise to display interference at the frame rate $f_{frame}$ and/or line-to-line frequency $f_{line}$. In particular, the presence of radio-frequency signals from external equipment 50 and/or circuitry in device 10 (e.g., wireless circuitry 34) can give rise to a potential for interference with the operation of display 14. Interference signals may be received directly from an internal or external signal source or may be the product of mixing signals and/or creating harmonics with nonlinear circuit components (i.e., interference signals may be associated with "beat" frequencies arising out of the mixing of two or more signals from two or more signal sources).

An example of a signal source that can be a significant contributor to display interference is an external near-field-communications reader. Interference during near-field communications can also be produced by near-field communications transceiver circuitry 120. In some situations, other external sources of radio-frequency signal interference may be present (e.g., signal sources associated with other external equipment 50 that is transmitting signals wirelessly over a link such as link 52). Interference that results from wireless signals (e.g., wireless signals from near-field communications equipment or other external equipment 50 or from wireless circuitry 34 such as wireless transceiver circuitry 120 or 90) is sometimes referred to as wireless interference.

Wireless interference at frequencies near the frame rate can give rise to flickering of display 14. Wireless interference at frequencies near the line frequency can give rise to repetitive lightening and darkening of lines in display 14 that can create unpleasant "waterfall" effects or other visible display artifacts (sometimes referred to as spatial lines effects).

Visible display artifacts such as flickering and spatial line effects can be reduced or eliminated by using control circuitry in device 10 (e.g., in display 14) to monitor for the presence of wireless interference. When wireless interference is detected, the clock signals or other control signals for pixels 56 that are produced by display 14 may be adjusted in frequency to eliminate the visible display artifacts.

Figure 4:
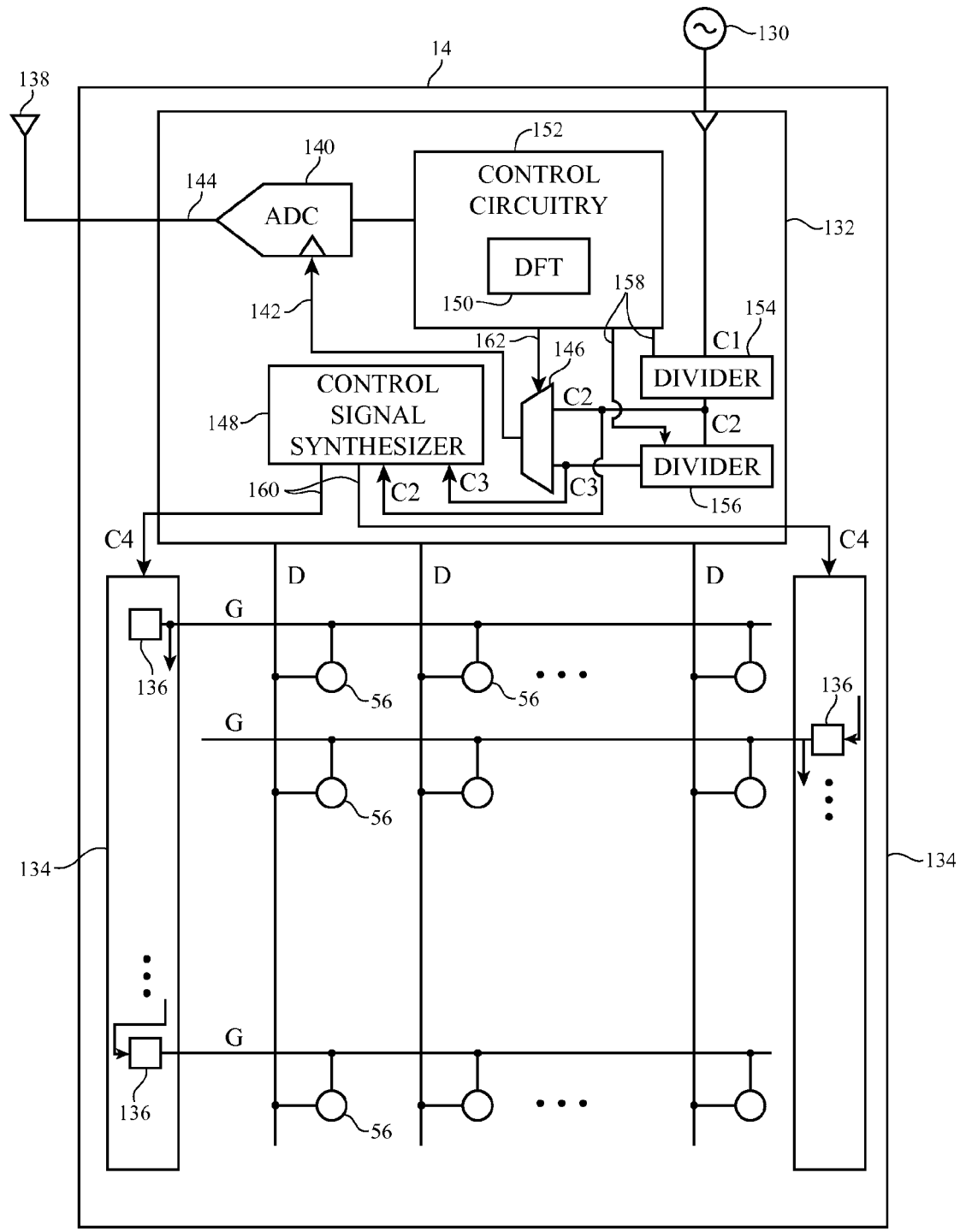
FIG. 4 is a diagram of an illustrative display and associated circuitry for reducing display interference in accordance with an embodiment.

A schematic diagram of illustrative circuitry for eliminating or otherwise reducing visible display artifacts in display 14 is shown in FIG. 4. As shown in FIG. 4, display 14 may include display driver circuitry 132 and gate driver circuitry 134. Display driver circuitry 132 and gate driver circuitry 134 may be implemented using one or more integrated circuits, thin-film transistor circuitry on a thin-film transistor substrate in display 14, etc. For example, display driver circuitry 132 may be implemented as part of a display driver integrated circuit and gate driver circuitry 134 may be implemented as thin-film transistor circuitry on a thin-film transistor layer in display 14.

Display driver circuitry 132 may receive an alternating current signal from an oscillator such as oscillator 130. The signal from oscillator 130 may have a frequency of about 10 MHz (as an example). Divider 154 and divider 156 may divide their inputs in frequency and may provide corresponding frequency-divided outputs. Control circuitry 152 may adjust dividers 154 and 156 by issuing control signals on paths 158.

Divider 154 may be used to reduce the frequency of the output from oscillator 130 (i.e., signal C1) to a frequency that is used as the line frequency for display 14 (i.e., signal C2 may be an alternating current signal have a frequency that is reduced from the frequency of alternating current signal C1 in accordance with the dividing function implemented by divider 154). The frequency of signal C2 (i.e., the line frequency $f_{line}$ of display 14) may be, for example, a frequency of about 20-40 kHz (depending on the number of rows in display 14).

Divider 156 may be used to reduce the frequency of signal C2 to a frequency equal to the frame rate for display 14 (e.g., about 60 Hz). Alternating current signal C3 at the output of divider 156 may therefore have a frequency equal to frame rate $f_{frame}$.

Control signal synthesizer 148 may receive signals C2 and C3 from dividers 154 and 156, respectively. Synthesizer 148 may use signals C2 and C3 to produce gate driver control signal(s) C4. Signals C4 may be applied to gate driver circuitry 134 to control the operation of the gate driver circuitry 134. In the example of FIG. 4, there is a block of gate driver circuitry on the left side of display 14 and a block of gate driver circuitry on the right side of display 14. This is merely illustrative. If desired, gate driver circuitry 134 may be located along only a single edge of the display pixel array formed form pixels 56.

Gate driver circuitry 134 contains registers 136 that are connected in chains to form shift registers. For example, the left-hand gate driver circuit of FIG. 4 may have registers 136 that are chained together to form a shift register that drives gate line signals G onto respective odd rows (lines) of pixels 56 in display 14 and the right-hand gate driver circuit of FIG. 4 may have registers 136 that are chained together to form a shift register that drives gate line signals G onto even rows of pixels 56 in display 14.

In the presence of wireless interference, the images displayed by pixels 56 have the potential to flicker or exhibit spatial line effects. To prevent wireless interference from producing these visible display artifacts on pixels 56, device 10 preferably includes an antenna such as antenna 138 for detecting wireless interference. Antenna 138 may be a patch antenna, an inverted-F antenna, a loop antenna, a slot antenna, or other suitable antenna in device 10. Antenna 138 may form some or all of one of antennas 40 of FIG. 2 or may be formed from an antenna structure that is separate from antennas 40.

When device 10 is near external wireless equipment such as a near-field communications reader or other equipment that is emitting wireless signals or when wireless circuitry 34 is producing wireless signals, antenna 138 can receive these wireless signals and can provide the received signals to input 144 of analog-to-digital converter 140. Analog-to-digital converter 140 and digital Fourier transform circuitry 150 form a spectrum analyzer circuit that can determine whether wireless interference is present that has the potential to create visible artifacts on display 14. Control circuitry 152 may use control signals on line 162 to control the state of multiplexer 146 and thereby determine whether signal C2 or C3 is routed to input 142 of analog-to-digital converter 140. The output of analog-to-digital converter 140 is provided to digital Fourier transform (DFT) circuitry 150 in control circuitry 152. By sampling antenna signals on input 144 of analog-to-digital converter 140 using either signal C2 or C3 and by implementing a digital Fourier transform on the output of analog-to-digital converter 140, control circuitry 152 can analyze the frequency spectrum of the signals received with antenna 138 in relation to signals C2 and C3. When control circuitry 152 directs multiplexer 146 to route signal C2 to analog-to-digital converter 140, the frequency spectrum of the wireless signals can be analyzed at frequencies in the vicinity of $f_{line}$. When control circuitry 152 directs multiplexer 146 to route signal C3 to analog-to-digital converter 140, the frequency spectrum of the wireless signals can be analyzed at frequencies in the vicinity of $f_{frame}$.

If no wireless interference is detected, control circuitry 152 can direct dividers 154 and 156 to maintain their current settings. If wireless interference is detected, however, control circuitry 152 can adjust dividers 154 and 156 so that the spectral peaks of the detected wireless interference are moved away from the frequencies associated with proper operation of display 14 (e.g., away from $f_{frame}$ and away from $f_{line}$).

Clock synthesizer 148 may receive signals C2 and C3 as inputs and may produce gate driver circuitry control signals C4 (sometimes referred to as clocks or clock signals) at one or more corresponding outputs 160. Gate driver circuit control signals C4 are applied to gate driver circuits 134 (e.g., signals C4 are supplied to the shift register circuitry formed from registers 136).

Figure 5:
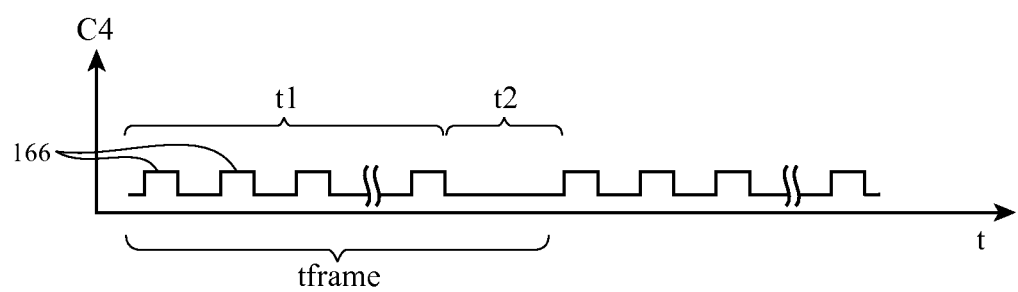
FIG. 5 is a graph of illustrative gate driver clock signals that may be used in controlling gate line driver circuitry in a display in accordance with an embodiment.

FIG. 5 is a graph of an illustrative gate driver circuit control signal C4. As shown in FIG. 5, signal C4 may repeat each frame time ($t_{frame}$). The signal pattern appearing for each frame time t has a frequency equal to the frame rate of display 14 (i.e., the signal in $t_{frame}$ repeats at the frame rate $f_{frame}$). Each frame contains a blanking interval t2 and a period t1 containing clock pulses 166 at a frequency equal to the line frequency $f_{line}$.

During wireless interference analysis operations, control circuitry 152 may use the spectrum analysis circuit formed from circuit 140 and 152 to determine whether signals are present that will lead to visible artifacts on display 14. Control circuitry 152 may, as an example, measure a signal spectrum of the type shown in FIG. 6, when the wireless interference received from antenna 138 is supplied to analog-to-digital converter 140 while analog-to-digital converter 14 is being triggered using signal C2 or C3 (i.e., a signal with a frequency equal to the current line frequency $f_{line}$ or frame rate $f_{frame}$ of display 14).

Figure 6:
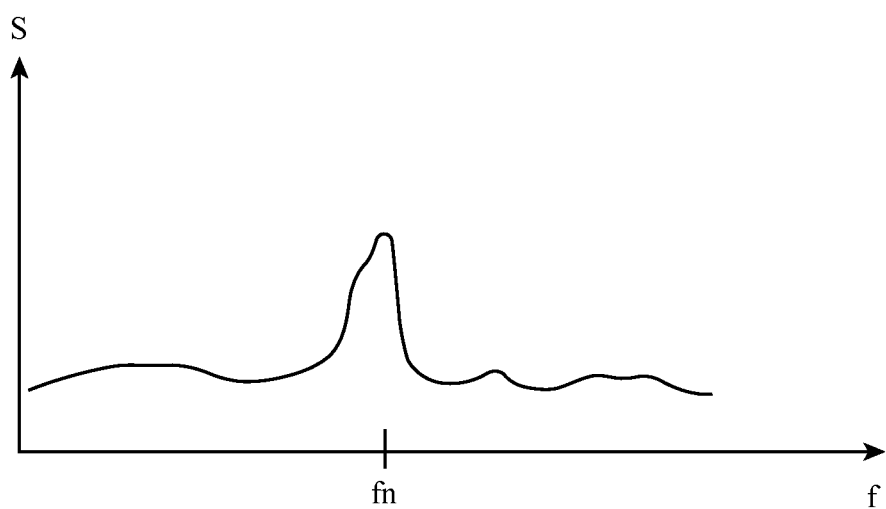
FIG. 6 is a graph of a frequency spectrum associated with operating a display in the presence of interference in accordance with an embodiment.

The spectrum of FIG. 6 is measured by control circuitry 152 using antenna 138, analog-to-digital converter 140, and digital Fourier transform circuit 150. In the graph of FIG. 6, signal strength S has been plotted as a function of frequency f. In the example of FIG. 6, interference is present that is giving rise to a signal peak at frequency fn. To prevent visible artifacts, control circuitry 152 can adjust divider circuitry such as divider 156 and/or divider 154 so that the signal at frequency $f_n$ is eliminated from the noise spectrum (e.g., so the signal at $f_n$ is moved to 0 Hz). Once these adjustments have been made, the frame rate $f_{frame}$ of signal C4 and the line frequency $f_{line}$ will be such that visible artifacts such as flickering and spatial line effects will be reduced or eliminated.

Figure 7:
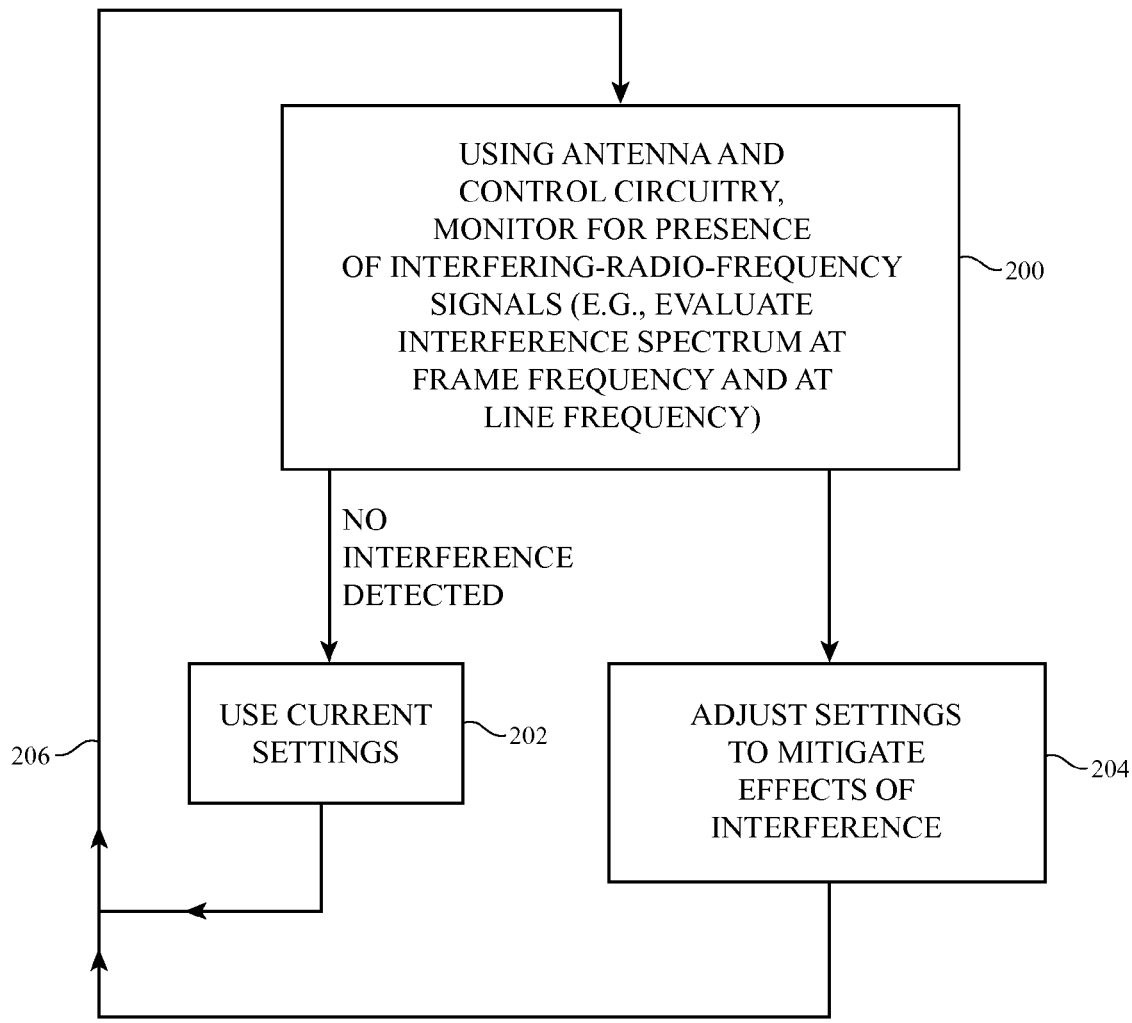
FIG. 7 is a flow chart of illustrative steps involved in operating a display while mitigating the effects of interference in accordance with an embodiment.

FIG. 7 is a flow chart of illustrative steps involved in adjusting display 14 to mitigate visible display interference effects resulting from the presence of wireless interference.

At step 200, the spectrum analyzer circuit formed from analog-to-digital converter 140 and control circuitry 152 (e.g., digital Fourier transform circuit 150) may be used to analyze the spectrum of signals on input 144 (i.e., the wireless signals received from antenna 138). Control circuitry 152 can adjust multiplexer 146 so that a selected one of signals C2 and C3 is applied to analog-to-digital converter 140 during each spectrum measurement.

If no signal peaks such as the peak at frequency fn in the illustrative spectrum of FIG. 6 are detected, control circuitry 152 can conclude that the wireless interference that is being applied to device 10 is too weak to cause visible display artifacts or is associated with a frequency that does not give rise to visible display artifacts. Accordingly, control circuitry 152 may, at step 202, continue to use the current settings for dividers 154 and 156 (i.e., current signals C2, C3, and C4 are not modified). These signals may correspond to a set of initial (default) values or may have been modified during previous adjustments by control circuitry 152.

If a signal peak is detected in one of the measured signal spectrums from the spectrum analyzer circuit, control circuitry 152 can conclude that visible artifacts will be produced (e.g., flickering or spatial line effects). Accordingly, control circuitry 152 may, at step 204, adjust signals C2 and/or C3 using dividers 154 and 156 so that signal peak is eliminated, thereby reducing or eliminating visible display artifacts.

Following steps 202 or 204, control can loop back to step 200, as indicated by line 206, so that additional measurements may be made. The process of using antenna 138 to monitor for the presence of wireless interference in real time while control circuitry 152 makes appropriate mitigating adjustments to gate driver circuit control signal C4 may take place continuously during operation of device 10 and display 14.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   an array of pixels that form a display;
   gate driver circuitry that supplies gate line signals on gate lines to respective rows of the pixels in response to a gate driver control signal;
   control circuitry that adjusts the gate driver control signal to eliminate visible display artifacts resulting from wireless interference;
   a first divider that divides a signal from an oscillator to produce a first alternating current signal;
   a second divider that divides the signals from the first divider to produce a second alternating current signal; and
   a circuit that creates the gate driver control signal from the first and second alternating current signals.

2. The electronic device defined in claim 1 further comprising:
   a spectrum analyzer circuit that produces signal spectrums that the control circuitry analyzes to determine whether the wireless interference is producing any visible display artifacts.

3. The electronic device defined in claim 2 further comprising:
   an antenna that provides signals to the spectrum analyzer circuit.

4. The electronic device defined in claim 3 wherein the spectrum analyzer circuit comprises an analog-to-digital converter that receives signals from the antenna.

5. The electronic device defined in claim 4 further comprising a multiplexer that is controlled by the control circuitry to supply a selected one of the first and second alternating current signals to the analog-to-digital converter.

6. The electronic device defined in claim 2 wherein the spectrum analyzer circuit comprises a digital Fourier transform circuit.

7. The electronic device defined in claim 6 further comprising:
   an antenna; and an analog-to-digital converter that receives signals from the antenna and that provides signals to the digital Fourier transform circuit.

8. The electronic device defined in claim 7 further comprising:
a near-field communications transceiver, wherein the wireless interference comprises wireless signals from an external near-field communications reader communicating with the near-field communications transceiver.

9. The electronic device defined in claim 1 wherein the display has a frame rate and a line frequency and wherein the first alternating current signal has the line frequency and wherein the second alternating current signal has the frame rate.

10. The electronic device defined in claim 1 further comprising a display driver integrated circuit that includes the control circuitry.

11. An electronic device, comprising:
an array of pixels that form a display;
gate driver circuitry that supplies gate line signals on gate lines to respective rows of the pixels in response to a gate driver control signal;
control circuitry that adjusts the gate driver control signal to eliminate visible display artifacts resulting from wireless interference; and
wireless transceiver circuitry that wirelessly communicates with external equipment, wherein the wireless interference comprises wireless signals from the external equipment that is communicating with the wireless transceiver circuitry, and wherein the wireless signals generate the wireless interference that produces the visible display artifacts without being received at the wireless transceiver circuitry.

12. The electronic device defined in claim 11 wherein the pixels comprise liquid crystal display pixels.

13. A display, comprising:
display pixels;
a display driver integrated circuit that supplies data signals to the display pixels and that produces a gate driver control signal from first and second alternating current signals;
gate driver circuitry that receives the gate driver control signal and that supplies gate line signals to the display pixels, wherein the display driver integrated circuit adjusts the gate driver control signal in real time to eliminate visible display artifacts on the display pixels due to wireless interference;
an antenna that receives wireless signals;
a spectrum analyzer circuit that receives the wireless signals and the first and second alternating current signals and that analyzes the wireless signals and the first and second alternating current signals to generate a signal spectrum, wherein the spectrum analyzer circuit receives one of the first and second alternating current signals at a time;
control circuitry that determines that the wireless signals will cause the visible display artifacts on the display pixels in response to a peak in the signal spectrum that indicates that the wireless interference is present between the wireless signals and the first and second alternating current signals; and;
a multiplexer that routes the one of the first and second alternating current signals to the spectrum analyzer circuit.

14. The display defined in claim 13 wherein the gate driver circuitry comprises a shift register that is controlled by the gate driver control signal, wherein the spectrum analyzer circuit includes an analog-to-digital converter, wherein the spectrum analyzer circuit includes a digital Fourier transform circuit that produces the signal spectrum by analyzing signals from the analog-to-digital converter, and wherein the display driver integrated circuit adjusts the gate driver control signal based on the signal spectrum.

15. An electronic device that communicates with external wireless equipment, comprising:
a wireless transceiver that receives wireless signals from the external wireless equipment;
a display;
an antenna that receives the wireless signals; and
a control circuit that adjusts the display based on analysis of the wireless signals received by the antenna to eliminate visible display artifacts on the display due to wireless interference caused by a portion of the wireless signals that are not received at the wireless transceiver, wherein the control circuit analyzes the portion of the wireless signals to determine whether the portion of the wireless signals will cause the visible display artifacts on the display and adjusts the display in response to determining that the portion of the wireless signals will cause the visible display artifacts on the display.

16. The electronic device defined in claim 15 wherein the control circuit comprises a spectrum analyzer circuit that analyzes the wireless signals received by the antenna.

17. The electronic device defined in claim 16 wherein the display includes gate driver circuitry that is controlled by a gate driver control signal and wherein the control circuit adjusts the display by adjusting the gate driver control signal using adjustable dividers.

* * * * *